United States Patent
Bartholomy et al.

(10) Patent No.: US 9,471,447 B2
(45) Date of Patent: *Oct. 18, 2016

(54) VIRTUALIZATION SIMULATION ENGINE INCLUDING ASSUMING A DORMANT STATE FOR A LOWER PRIORITY APPLICATION

(71) Applicant: International Business Machines Corporation, Armonk, NY (US)

(72) Inventors: Erik Bartholomy, Superior, CO (US); Christopher P. Evans, Firestone, CO (US); Frank J. Giordano, Richlands, NC (US); Gordan G. Greenlee, Endicott, NY (US); Paul W. Novak, Vestal, NY (US); Richard J. Sheftic, Essex Junction, VT (US); Victor L. Walter, Hygiene, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/717,151

(22) Filed: May 20, 2015

(65) Prior Publication Data
US 2015/0261629 A1  Sep. 17, 2015

Related U.S. Application Data

(63) Continuation of application No. 13/665,574, filed on Oct. 31, 2012, now Pat. No. 9,104,607.

(51) Int. Cl.
G06F 11/20 (2006.01)
G06F 11/14 (2006.01)
G06F 11/26 (2006.01)
G06F 9/455 (2006.01)

(52) U.S. Cl.
CPC ............ *G06F 11/203* (2013.01); *G06F 11/14* (2013.01); *G06F 11/1438* (2013.01); *G06F 11/261* (2013.01); *G06F 2009/4557* (2013.01)

(58) Field of Classification Search
CPC .... G06F 11/14; G06F 9/4856; G06F 9/4862; G06F 9/4868; G06F 9/45533; G06F 9/45558; G06F 9/4557; G06F 9/45575; G06D 2009/4557; G06D 9/45575
See application file for complete search history.

(56) References Cited

U.S. PATENT DOCUMENTS 5,917,997 A   6/1999  Bell et al.
6,108,300 A   8/2000  Coile et al.
(Continued)

FOREIGN PATENT DOCUMENTS

CN   101055538 A   10/2007
CN   101330643 A   12/2008
CN   101924988 A   12/2010

OTHER PUBLICATIONS

Wood et al., "Disaster Recovery as a Cloud Service: Economic Benefits & Deployment Challenges," May 2010, pp. 1-7, University of Massachusetts, retrieved from: http://www.usenix.org/event/hotcloud10/tech/full_papers/Wood.pdf.

(Continued)

*Primary Examiner* — Joseph Schell
(74) *Attorney, Agent, or Firm* — Lisa Ulrich; Hoffman Warnick LLC

(57) ABSTRACT

An approach is provided for determining disaster recovery capacity. A simulation hypervisor receives streaming metric data, which represents the current production workload of a primary site, from the primary site. The metric data is combined with production data of the backup site by the simulation hypervisor to simulate a recovery event. Using data from the simulating, disaster recovery planning can be performed.

22 Claims, 10 Drawing Sheets

(56) References Cited

U.S. PATENT DOCUMENTS

| | | | |
|---|---|---|---|
| 7,139,926 B1 | 11/2006 | Madhav et al. | |
| 7,191,327 B2 | 3/2007 | Viljoen et al. | |
| 7,296,182 B2 | 11/2007 | Greenspan et al. | |
| 7,379,990 B2 | 5/2008 | Tsao | |
| 7,451,208 B1 | 11/2008 | Bakke et al. | |
| 7,509,535 B1 | 3/2009 | Gulve et al. | |
| 7,565,501 B2 | 7/2009 | Mogi et al. | |
| 7,711,983 B2 | 5/2010 | Hatasaki et al. | |
| 7,730,486 B2 * | 6/2010 | Herington | G06F 9/5077 709/223 |
| 7,818,615 B2 | 10/2010 | Krajewski, III et al. | |
| 7,987,154 B2 | 7/2011 | Di Giglio et al. | |
| 8,051,322 B2 | 11/2011 | Matsumoto et al. | |
| 8,095,929 B1 * | 1/2012 | Ji | G06F 9/4856 709/223 |
| 8,261,268 B1 | 9/2012 | Forgette | |
| 8,413,146 B1 | 4/2013 | McCorkendale et al. | |
| 8,762,339 B2 | 6/2014 | Bartholomy et al. | |
| 8,789,048 B2 | 7/2014 | Bozek et al. | |
| 9,081,613 B2 | 7/2015 | Bieswanger et al. | |
| 2006/0005189 A1 | 1/2006 | Vega et al. | |
| 2006/0126619 A1 | 6/2006 | Teisberg et al. | |
| 2007/0078982 A1 | 4/2007 | Aidun et al. | |
| 2008/0313242 A1 | 12/2008 | Doerr | |
| 2009/0119536 A1 | 5/2009 | Guo et al. | |
| 2009/0235265 A1 | 9/2009 | Dawson et al. | |
| 2009/0271658 A1 | 10/2009 | Aidun | |
| 2009/0313311 A1 | 12/2009 | Hoffmann et al. | |
| 2011/0161851 A1 | 6/2011 | Barber et al. | |
| 2011/0211440 A1 | 9/2011 | Arsenault et al. | |
| 2011/0289345 A1 | 11/2011 | Agesen et al. | |
| 2012/0136833 A1 | 5/2012 | Bartholomy et al. | |
| 2012/0159235 A1 | 6/2012 | Suganthi et al. | |
| 2012/0240226 A1 | 9/2012 | Li | |
| 2013/0297769 A1 * | 11/2013 | Chang | G06F 9/45558 709/224 |
| 2013/0346803 A1 | 12/2013 | Chiruvolu et al. | |

OTHER PUBLICATIONS

Kahane et al., "Computer Backup Pools, Disaster Recovery, and Default Risk," Jan. 1988, pp. 78-83, Communications of the ACM, vol. 31, No. 1.

Maffei et al., "Remote Dual Copy: Hot Backup Site Now a Reality, But, at What Cost," Dec. 1997, 1 page (Abstract), The 1997 23rd International Conference for the Resource Management & Performance Evaluation of Enterprise Computing Systems, Part 2 (of 2), CSA Technology Research Database.

Synergistic Online Solutions, Disaster Recovery, SynergisticHotSite, retrieved from: http://www.synergisticonline.com/dr.html#hotsite, 3 pages.

Chen et al., "The Challenge and Solutions of NAT Traversal for Ubiquitous and Pervasive Applications on the Internet," 2009, pp. 1620-1626, The Journal of Systems and Software, vol. 82.

Volz et al., "The Dynamic Host Configuration Protocol (DHCP) Client Fully Qualified Domain Name (FQDN) Option (RFC4702)," Oct. 2006, 19 pages, Internet Society Requests for Comment (RFCs), IPCOM000142378D.

Brooks, Office Action Communication for U.S. Appl. No. 12/955,483 dated Jan. 17, 2013, 31 pages.

Brooks, Office Action Communication for U.S. Appl. No. 12/955,483 dated Jun. 19, 2013, 35 pages.

Brooks, Office Action Communication for U.S. Appl. No. 12/955,483 dated Aug. 22, 2013, 33 pages.

Brooks, Notice of Allowance and Fee(s) Due for U.S. Appl. No. 12/955,483 dated Feb. 14, 2014, 12 pages.

International application No. PCT/ CN2013 /084936, International Search Report and Written Opinion, dated Jan. 16, 2014, 12 pages.

Moses et al., Shared Resource Monitoring and Throughput Optimization in Cloud-Computing Datacenters, 2011, pp. 1024-1033, IEEE International Parallel & Distributed Processing Symposium.

Mehrmanesh, Office Action Communication for U.S. Appl. No. 13/673,098 dated Sep. 25, 2014, 23 pages.

Mehrmanesh, Office Action Communication for U.S. Appl. No. 13/673,098 dated Jan. 23, 2015, 10 pages.

Schell, Office Action Communication for U.S. Appl. No. 13/665,574 dated Sep. 11, 2014, 36 pages.

Schell, Office Action Communication for U.S. Appl. No. 13/665,574 dated Feb. 20, 2015, 26 pages.

Schell, Notice of Allowance and Fee(s) Due for U.S. Appl. No. 13/665,574 dated Mar. 27, 2015, 6 pages.

Mehrmanesh, Notice of Allowance and Fee(s) Du for U.S. Appl. No. 13/673,098 dated Apr. 6, 2015, 9 pages.

Chinese Office Action Communication for Application No. 201310528948.X, Dated Feb. 3, 2016, 10 pages.

Taiwan Office Action Communication for Application No. 10520106730, Dated Jan. 29, 2016, 6 pages.

\* cited by examiner

| Application | Priority | Threads | Processor | Cache | Memory | ... |
|---|---|---|---|---|---|---|
| A | Low | 3 | 2.5k | 25 | 1k | |
| B | Mid | 2 | 3k | 77 | 2.2k | |
| C | High | 5 | 4.2k | 60 | 4.9k | |
| ... | | | | | | |
| N | Mid | 2 | 3.5k | 85 | 0.5k | |

VIRTUALIZATION SIMULATION ENGINE INCLUDING ASSUMING A DORMANT STATE FOR A LOWER PRIORITY APPLICATION

TECHNICAL FIELD

The subject matter of this invention relates generally to disaster recovery. More specifically, aspects of the present invention provide a solution for preparing a site used for disaster recovery.

BACKGROUND

Computer applications are pieces of computer software that help a user thereof perform a task or a number of related tasks. In the electronic environment of today, these applications are often provided in such a way as to be accessible to a number of users. To accomplish this, a provider of the application may host the application from a particular location that is accessible via a network, such as a local area network or wide area network, such as the Internet.

In hosting the application, the provider usually hopes to attain a state in which the application is available to users in a continuous manner. However, sometimes problems arise that may cause availability to be interrupted. For example, a catastrophic disaster, such as an earthquake, fire, etc., could occur at the primary host site. In the alternative, the machine or machines may experience hardware and/or software malfunctions that cause the application to cease performing. Alternatively, communications between the host and the network may be lost, resulting in an inability of users to access the application. When these events occur, providers often perform disaster recovery to restore application functionality to users.

Currently, providers can prepare for disaster recovery in several ways. Many companies opt for an active/dormant solution in which the primary site is live and active and replicates to one or more disaster recovery servers, which are not live, in the background. During a disaster recovery (DR) event, the traffic fails over to the disaster recovery site and the previously dormant server or servers assume the full workload.

SUMMARY

Applicants have discovered that challenges exist in projecting workload forecasts onto another server that will be used for DR. For example, it may be difficult, in the abstract, to know how the virtualization logic that is needed to collapse and reinflate workload in a virtualized capacity solution will affect the virtualization hypervisor in the DR site. This could lead to a misallocation of resources to the DR site. For example, too little DR-based workload being allocated to a particular site could result in more hardware being installed than is necessary. On the other hand, if there is an over-commitment of resources, these resources may not be accessible in a timely manner during a DR event.

In general, aspects of the present invention provide an approach for determining disaster recovery capacity. A simulation hypervisor receives streaming metric data, which represents the current production workload of a primary site, from the primary site. The metric data is combined with production data of the backup site by the simulation hypervisor to simulate a recovery event. Using data from the simulation, disaster recovery planning can be performed.

A first aspect of the invention provides a method for determining disaster recovery capacity, comprising: receiving, by a simulation hypervisor, streaming metric data from a primary site, the streaming metric data representing a current production workload of the primary site; simulating, by the simulation hypervisor, a recovery event on a backup site by combining the metric data with production data of the backup site; and performing disaster planning based on the simulating.

A second aspect of the invention provides a system for determining disaster recovery capacity, comprising: a computer device having a simulation hypervisor installed thereon, the simulation hypervisor performing a method, comprising: receiving, by the simulation hypervisor, streaming metric data from a primary site, the streaming metric data representing a current production workload of the primary site; simulating, by the simulation hypervisor, a recovery event on a backup site by combining the metric data with production data of the backup site; and performing disaster planning based on the simulating.

A third aspect of the invention provides a computer program product embodied in a computer readable storage medium that implements a method for determining disaster recovery capacity, the method comprising: receiving, by a simulation hypervisor, streaming metric data from a primary site, the streaming metric data representing a current production workload of the primary site; simulating, by the simulation hypervisor, a recovery event on a backup site by combining the metric data with production data of the backup site; and performing disaster planning based on the simulating.

A fourth aspect of the present invention provides a method for deploying a system for determining disaster recovery capacity, comprising, providing a computer system operable to: receive, by a simulation hypervisor, streaming metric data from a primary site, the streaming metric data representing a current production workload of the primary site; simulate, by the simulation hypervisor, a recovery event on a backup site by combining the metric data with production data of the backup site; and perform disaster planning based on the simulating.

Still yet, any of the components of the present invention could be deployed, managed, serviced, etc., by a service provider who offers to determine disaster recovery capacity.

Embodiments of the present invention also provide related systems, methods and/or program products.

BRIEF DESCRIPTION OF THE DRAWINGS

These and other features of this invention will be more readily understood from the following detailed description of the various aspects of the invention taken in conjunction with the accompanying drawings in which.

Figure 1:
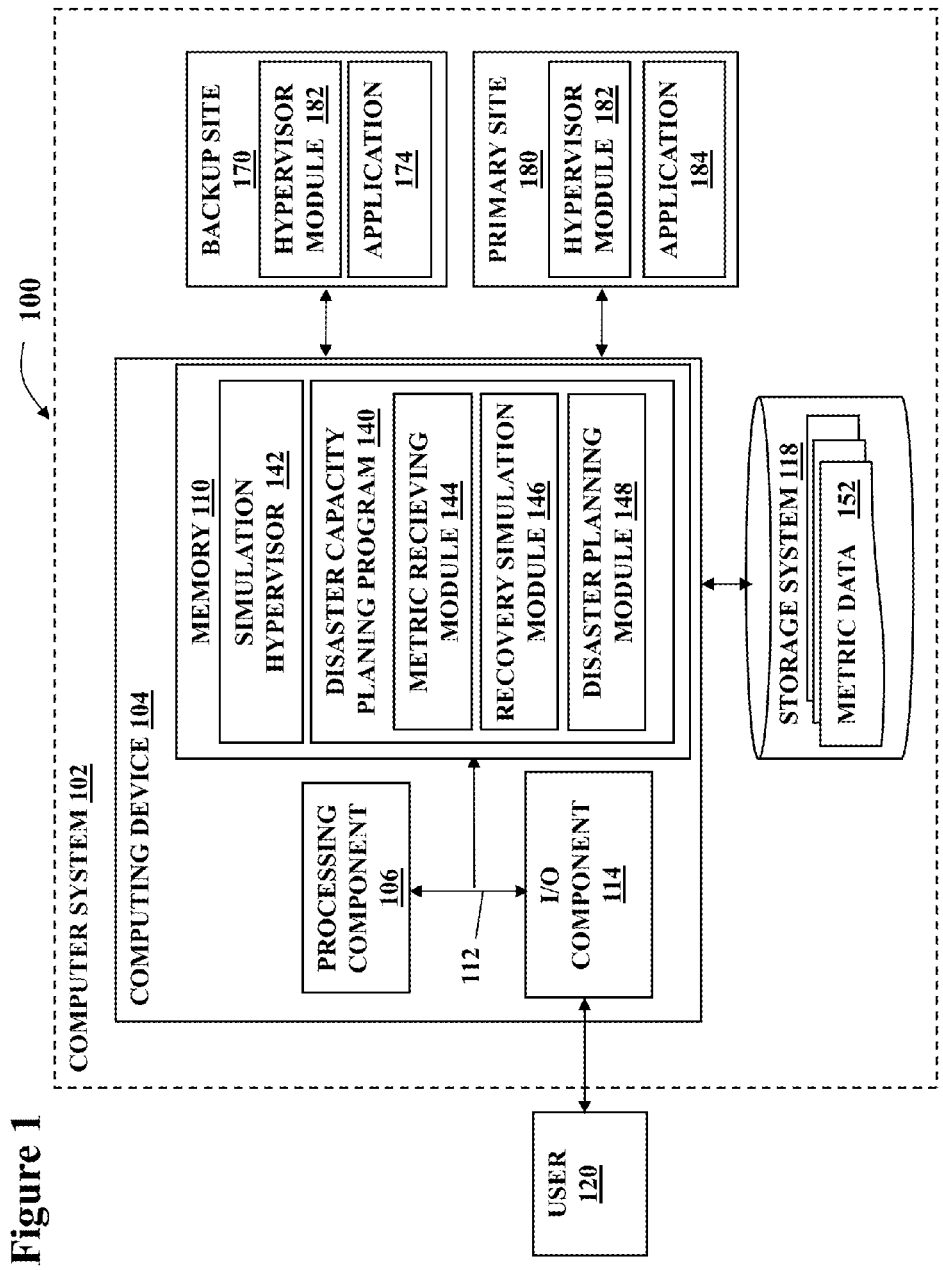
FIG. 1 shows a data processing system suitable for implementing an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As indicated above, aspects of the present invention provide an approach for determining disaster recovery capacity. A simulation hypervisor receives streaming metric data, which represents the current production workload of a primary site, from the primary site. The metric data is combined with production data of the backup site by the simulation hypervisor to simulate a recovery event. Using data from the simulation, disaster recovery planning can be performed.

Turning to the drawings, FIG. 1 shows an illustrative environment 100 for determining disaster capacity. To this extent, environment 100 includes a computer system 102 that can perform a process described herein in order to determine disaster capacity. In particular, computer system 102 is shown including a computing device 104 that includes a disaster capacity planning program 140, which makes computing device 104 operable to determine disaster capacity by performing a process described herein.

Computing device 104 is shown including a processing component 106 (e.g., one or more processors), a memory 110, a storage system 118 (e.g., a storage hierarchy), an input/output (I/O) interface component 114 (e.g., one or more I/O interfaces and/or devices), and a communications pathway 112. In general, processing component 106 executes program code, such as a simulation hypervisor 142 and/or disaster capacity planning program 140, which are at least partially fixed in memory 110. To this extent, processing component 106 may comprise a single processing unit, or be distributed across one or more processing units in one or more locations, e.g., on a client and server.

Memory 110 can also include local memory, employed during actual execution of the program code, bulk storage (storage 118), and/or cache memories (not shown) which provide temporary storage of at least some program code in order to reduce the number of times code must be retrieved from bulk storage 118 during execution. As such, memory 110 may comprise any known type of data storage and/or transmission media, including magnetic media, optical media, random access memory (RAM), read-only memory (ROM), a data cache, a data object, etc. Moreover, similar to processing component 106, memory 110 may reside at a single physical location, comprising one or more types of data storage, or be distributed across a plurality of physical systems in various forms.

While executing program code, processing component 106 can process data, which can result in reading and/or writing transformed data from/to memory 110 and/or I/O component 114 for further processing. Pathway 112 provides a direct or indirect communications link between each of the components in computer system 102. I/O component 114 can comprise one or more human I/O devices, which enable a human user 120 to interact with computer system 102 and/or one or more communications devices to enable a system user 120 to communicate with computer system 102 using any type of communications link.

To this extent, disaster capacity planning program 140 can manage a set of interfaces (e.g., graphical user interface(s), application program interface, and/or the like) that enable human and/or system users 120 to interact with disaster capacity planning program 140, e.g., to determine disaster capacity on a potential backup system 170. Users 120 could include network administrators, disaster planners and/or anyone else who needs to determine whether a backup site 170 has sufficient capacity, among others. Further, disaster capacity planning program 140 can manage (e.g., store, retrieve, create, manipulate, organize, present, etc.) the data, such as one or pieces of metric data 152, using any solution.

In any event, computer system 102 can comprise one or more general purpose computing articles of manufacture 104 (e.g., computing devices) capable of executing program code, such as disaster capacity planning program 140, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, disaster capacity planning program 140 can be embodied as any combination of system software and/or application software. In any event, the technical effect of computer system 102 is to provide processing instructions to computing device 104 in order to determine disaster capacity.

Further, disaster capacity planning program 140 can be implemented using a set of modules 144-148. In this case, modules 144-148 can enable computer system 102 to perform a set of tasks used by disaster capacity planning program 140, and can be separately developed and/or implemented apart from other portions of disaster capacity planning program 140. As used herein, the term "component" or "element" means any configuration of hardware, with or without software, which implements the functionality described in conjunction therewith using any solution, while the term "module" means program code that enables a computer system 102 to implement the actions described in conjunction therewith using any solution. When fixed in a memory 110 of a computer system 102 that includes a processing component 106, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 102.

When computer system 102 comprises multiple computing devices 104, each computing device 104 could have only a portion of disaster capacity planning program 140 fixed thereon (e.g., one or more modules 144-148). However, it is understood that computer system 102 and disaster capacity planning program 140 are only representative of various possible equivalent computer systems that may perform a process described herein. To this extent, in other embodiments, the functionality provided by computer system 102 and disaster capacity planning program 140 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 102 includes multiple computing devices 104, the computing devices can communicate over any type of communications link. Further, while performing a process described herein, computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, disaster capacity planning program 140 enables computer system 102 to determine disaster capacity. To this extent, disaster capacity planning program 140 is shown including a metric receiving module 144, a recovery simulation module 146, and a disaster planning module 148, any or all of which can be performed by simulation hypervisor 142. Simulation hypervisor 142 provides a virtual server that can run in the background of a primary site 180, backup site 170 and/or a tertiary site. This allows simulation hypervisor 142 to perform its functions without affecting the operations of other applications 174, 184 that may be running on backup site 170 and/or primary site 180. To this extent, simulation hypervisor 142 can be installed directly in the existing physical storage on a site as a hypervisor for a virtual server. In the alternative, simulation hypervisor 142 can inhabit its own physical storage that is then physically installed on the site.

Figure 2:
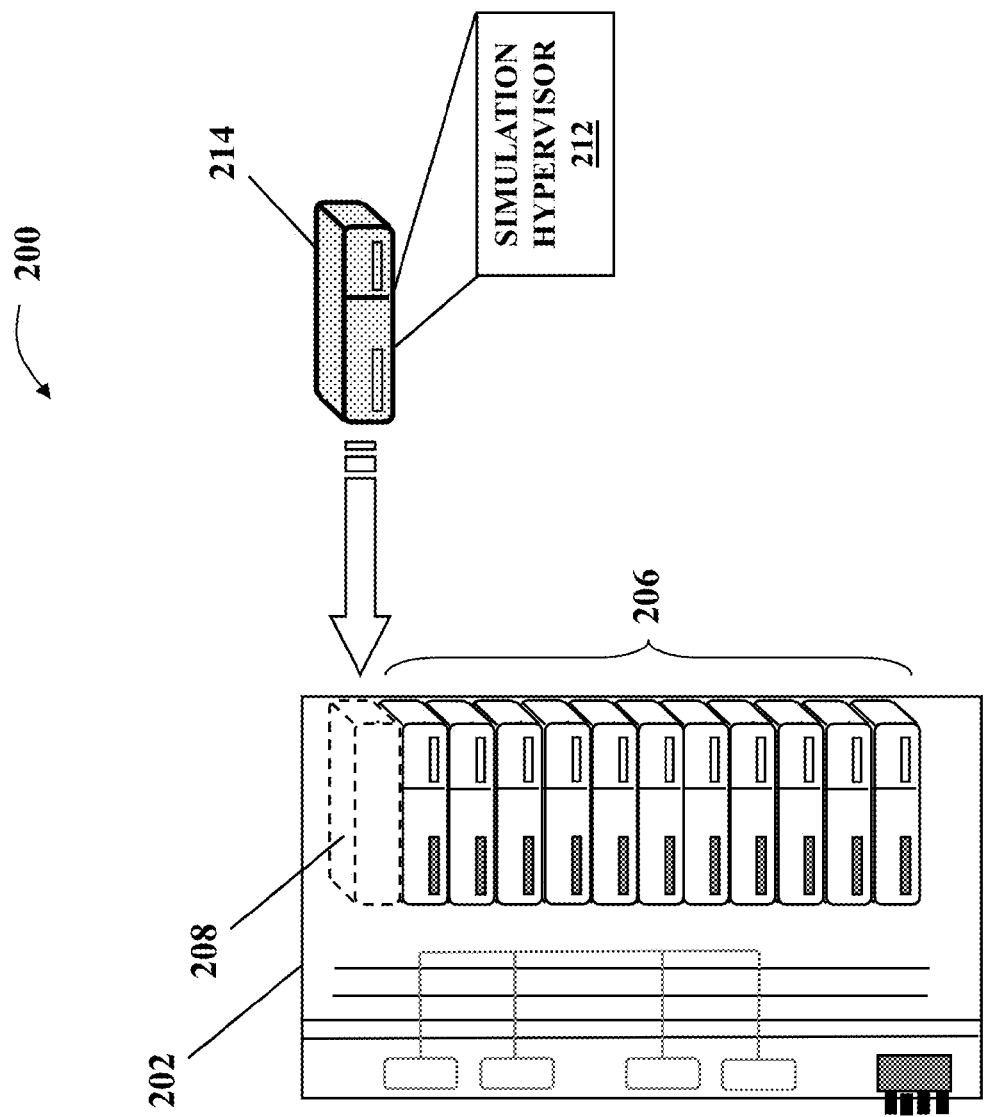
FIG. 2 shows an installation of a simulation hypervisor according to an embodiment of the invention.

Referring now to FIG. 2, an installation 200 of a simulation hypervisor 212 according to an embodiment of the invention is shown. As shown, a server 202 is selected for installation. Server 202 can be a backup site 170 (FIG. 1), a primary site 180 or a tertiary site. In any case, server 202 can have a number of components 206 installed therein, which can be used to execute applications in a production environment, or the like, during times in which backup services are unneeded. In addition, server 202 contains an interface 208, which can accept components. Interface 208 can be a standard interface, such as an interface used to plug in storage and/or processing components (e.g., pluggable components known as pizza boxes) in a server environment. In the alternative, interface 208 can be adapted specifically for a particular component. In any case, a hardware component 214 can be configured specifically to execute simulation hypervisor 212. To this extent, hardware component 214 can contain one or more processors, memories, storage systems, etc., as needed to execute simulation hypervisor 212. As such, in an embodiment, hardware component 214 can minimize usage of resources that backup site 202 uses to perform its normal functions that are needed to operate simulation hypervisor 212. In any case, hardware component 214, with simulation hypervisor 212 installed can be installed on server 202 via interface 208.

Figure 3:
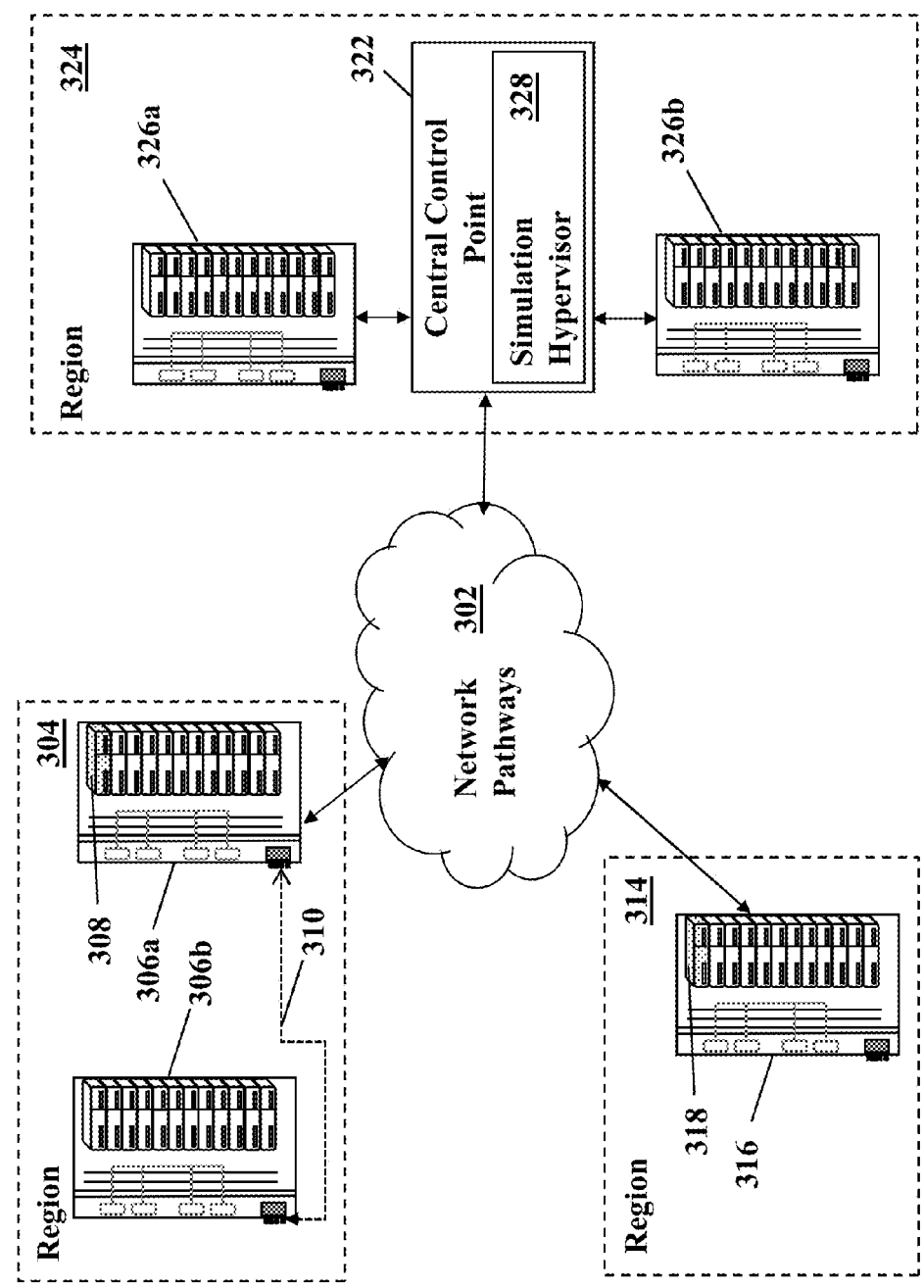
FIG. 3 shows an example geographically distributed network according to an embodiment of the invention.

Turning now to FIG. 3, a geographically distributed network 302 according to an embodiment of the invention is shown. As shown, geographically distributed network 300 includes a number of distinct regions 304, 314 and 324. Each of these regions 304, 314, 324 can represent a particular geographical designation (city, region, country, landmass, continent, etc.). So, for example, region 304 could include some or all of Japan, while regions 314 and 324 could each be regions within the United States. To this extent, one or more of the regions 304, 314, 324 could be geographically distant from any or all of the other regions 304, 314, 324. In any case, as illustrated, each region 304, 314, 324 is shown having one or more servers 306a, 306b, 316, 326a, 326b. As shown, servers 306a and 316 each have a hardware component 308, 318 installed that is similar to hardware component 214 having been configured specifically to execute simulation hypervisor 212 (FIG. 2). This hardware component 308, 318 allows servers 306a and 316 to communicate directly with each other over network pathways 302 without a need for a dedicated connector for each connection. In contrast server 306b, which, although illustrated in the same region 304 as server 306a, does not need to be, does not have a hardware component 214 configured specifically to execute simulation hypervisor 212 (FIG. 2). Because of this, server 306b is shown as connecting to server 306a along a pathway that connects to a dedicated connector. In further contrast, servers 326a and 326b connect to the other servers through network pathways 302 by way of a central control point 322. As shown, central control point 322 is shown as having a simulation hypervisor 328 installed as software. However, it should be recognized that simulation hypervisor 328 could also be installed in a hardware component 214 (FIG. 2), which is physically installed on central control point 322. Further, simulation hypervisor could, additionally or in the alternative, be installed in one or both of servers 326a, 326b.

Turning back to FIG. 1, metric receiving module 144, as executed by computer system 102, can receive streaming metric data 152 from a primary site. For example, a simulation hypervisor 142 that is located backup site 170 can be configured to communicate with a hypervisor module 182 on the primary site 180 over network pathways 302 (FIG. 3), or the like, and hypervisor module 182 on the primary site 180 can transfer the streaming metric data 152 to the simulation hypervisor 142 on the backup site 170. In an embodiment, simulation hypervisor 142 that receives the streaming metric data 152 could be located on a tertiary site instead of or in addition to the backup site 170. In an embodiment, simulation hypervisor 142 could be located on the primary site itself and could gather the streaming metric data 152 locally. This streaming metric data 152 can represent the current production workload of the primary site 180. However, it is not required that the metric data 152 contain every transaction, operation, etc., being performed on the primary site 180. Rather, metric data 152 can contain only a statistical representation gathered from the primary site. Metric data 152 gathered in this manner can provide an accurate representation of the operation of the primary site using only a fraction of the resources that would be required to transfer complete operations data. Thus, the streaming metric data 152 received by server 170 can provide a representation of the workload of the primary site in real time.

Figure 4:
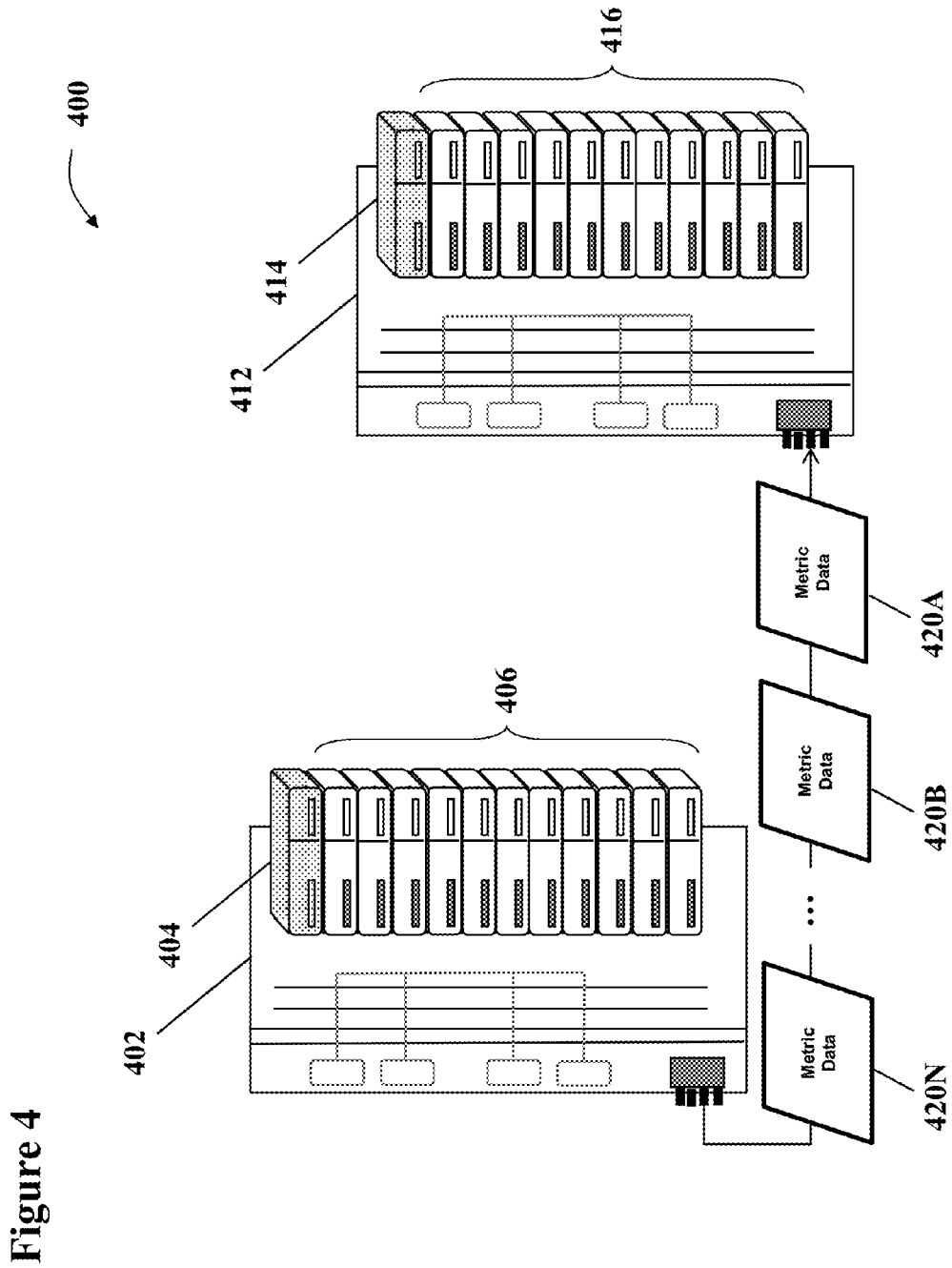
FIG. 4 shows receiving of streaming metric data according to an embodiment of the invention.

Turning now to FIG. 4, a data flow 400 that illustrates receiving of streaming metric data according to an embodiment of the invention is shown. As shown, data flow 400 includes a primary site 402. Primary site 402 has a number of production applications 406 executing thereon. In addition, primary site 402 has a hypervisor module 404. Also shown in the figure is a potential backup site 412. Backup site 412 also has a number of production applications 416 executing thereon, as well as a simulation hypervisor 414.

To this extent, backup site 412 can also operate as a production site that executes its production applications 416 when backup site 412 is not needed for disaster recovery services. As illustrated, a stream of metric data 420A-N from primary site 402 is being received by backup site 412. For example, hypervisor module 404 on primary site 402 can gather metric data 420A-N regarding the ongoing execution of production applications 406. This metric data 420A-N can be gathered based on monitoring functions typical to a server, can be acquired from log results or functions run against the server and/or can be gathered by agents and/or any other solution now known or later developed for gathering metric data for a server environment. In any case, metric data 420A-N provides a representation of the current production workload generated by production applications 406 on primary site 402. This metric data 420A-N can be communicated by hypervisor module 404 of primary site 402 to be received by simulation hypervisor 414 of backup site 412. As such, the stream of metric data 420A-N can convey a real-time representation of the current production workload of primary site 402. This metric data 420A-N can be sent from primary site 402 to backup site 412 as the two are executing their respective production applications 406, 416 without disrupting the execution thereof.

Figure 5:
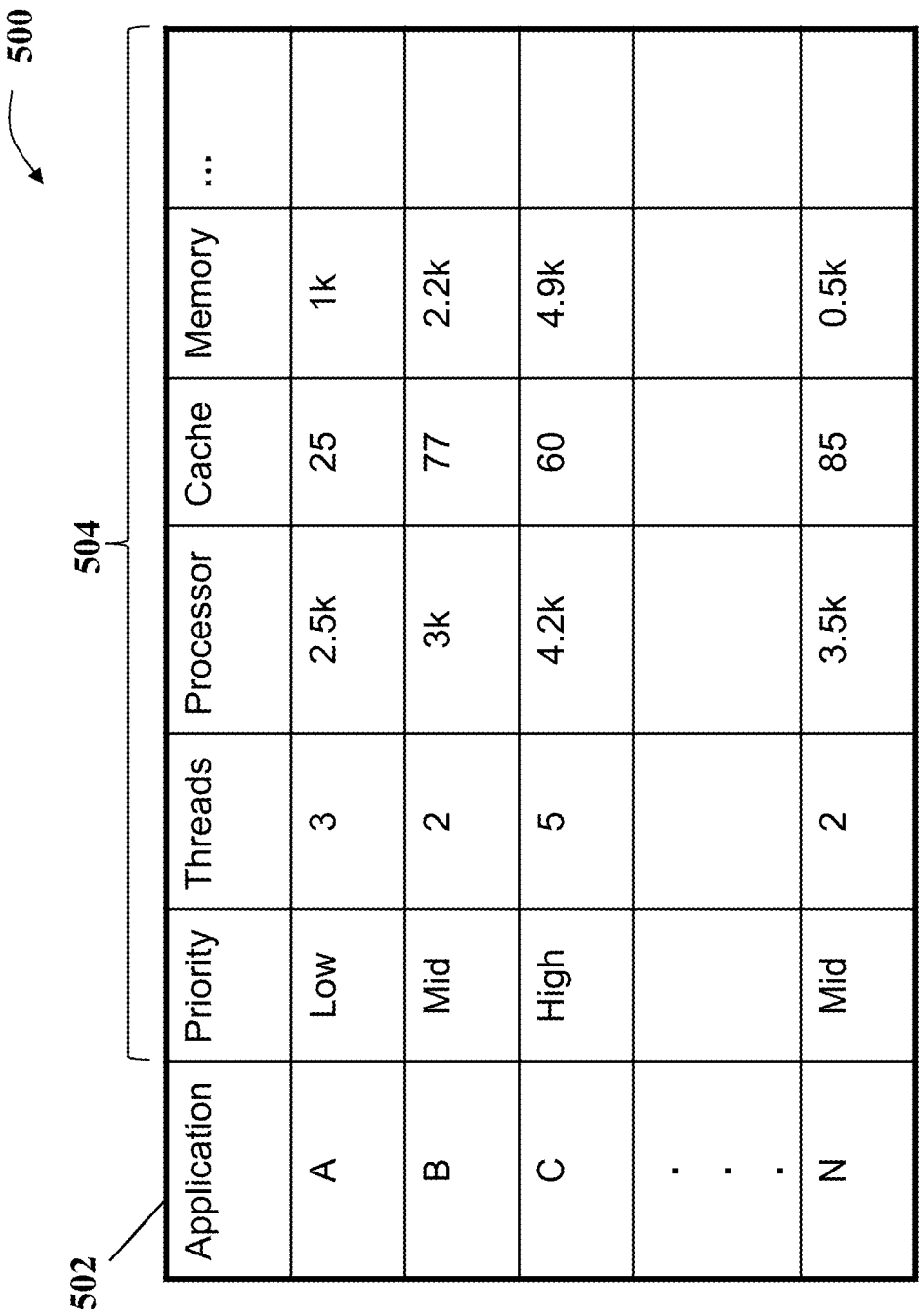
FIG. 5 shows example metric data according to an embodiment of the invention.

Turning now to FIG. 5, example metric data 500 according to an embodiment of the invention is shown. As shown, metric data 500 includes a list of applications 502 that are being executed on primary site 402 (FIG. 4). It should be understood that not all applications 502 being executed on primary site 402 (FIG. 4) need be included. Rather, in an embodiment, a subset of the processes being executed on primary site 402 (FIG. 4), such as only those applications requiring backup can be included. Further, in an embodiment, metric data 500 could include an aggregation of several or all of the applications on primary site 402 (FIG. 4). Metric data 500 also includes a set of metrics 504. As illustrated, metrics 504 can include data for priority, threads, processor use, cache hits, memory use, and the like. It should be understood that this list is only meant to be illustrative. Rather, any of the above listed fields in the above list could be omitted and/or other fields could be included. Further, although metric data 500 is illustrated herein in a tabular format, this format should not be taken as limiting.

Figure 6:
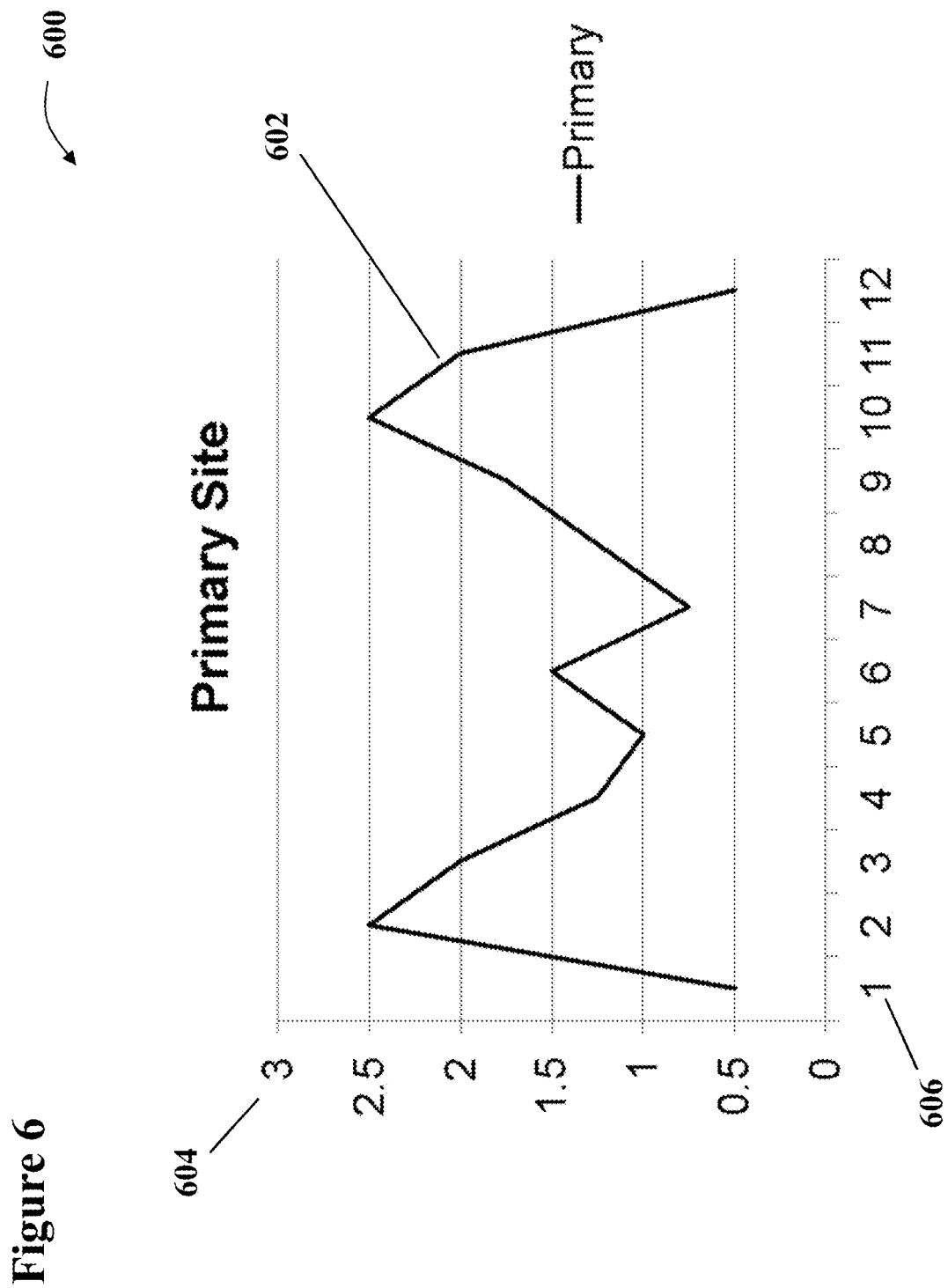
FIG. 6 shows an example graph representation of metric data from a primary site according to an embodiment of the invention.

Turning now to FIG. 6, an example graph representation 600 of metric data according to an embodiment of the invention is shown. As illustrated graph representation 600 includes a plot line 602. Plot line 602 indicates an amount of resource use 604 over a time period 606. For purposes of illustration only, plot line 602 represents an aggregate resource use for applications 406 on primary site 402 (FIG. 4) for which backup is desired.

Turning back to FIG. 1, recovery simulation module 146, as executed by computer system 102, simulates a recovery event on backup site 170. This can be performed by simulation hypervisor 142. Simulation hypervisor 142 can perform this simulation wherever it is installed. In an embodiment, simulation hypervisor 142 can perform the simulation running on the background of backup site 170. Alternatively, the simulation can be performed on the primary site 180 or on a tertiary site. In any case, the recovery event can be simulated by combining the metric data 152 received from production site 402 (FIG. 4) with production data from backup site 170. In the case that the simulation is performed on the primary site 180 or on a tertiary site, simulation hypervisor 142 can acquire production data from backup site 170, using any solution, such as via a hypervisor module 172 located on backup site 170 or the like, in order to perform the combination. Because the metric data 152 and/or the production data is being received in a stream from primary site 180 and/or backup site 170, this simulation can be performed in real time. In the alternative, one or more of metric data 152 or the production data can be stored, such as in storage system 118 and replayed for purposes of performing the simulation at a later time.

Figure 7:
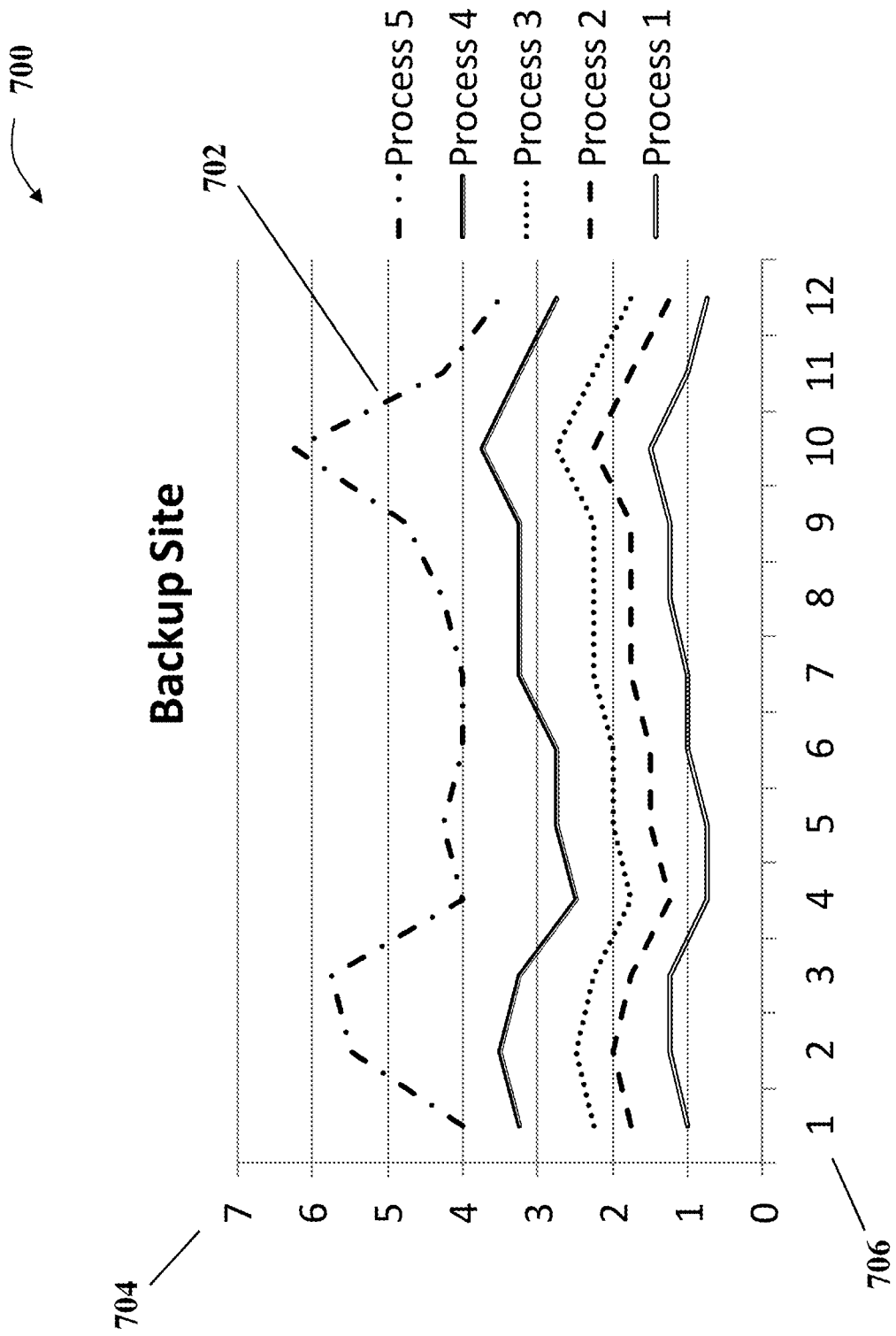
FIG. 7 shows an example graph representation of production data at a potential backup site according to an embodiment of the invention.

Turning now to FIG. 7, in conjunction with FIG. 1, an example graph representation 700 of production data at a potential backup site 170 according to an embodiment of the invention is shown. As illustrated graph representation 700 includes a number of aggregating plot lines 702 (process 1, process 2, process 3, process 4, process 5), each of which represents a production application 174 on backup site 170. Similar to plot line 602 in graph representation 600 (FIG. 6), plot lines 702 indicate an amount of resource use 704 over a time period 706. Each plot line 702 represents an application in aggregation with the plot lines beneath it. For purposes of illustration only, each of plot lines 702 represents an aggregate resource use for applications 406 on backup site 416 (FIG. 4).

Figure 8:
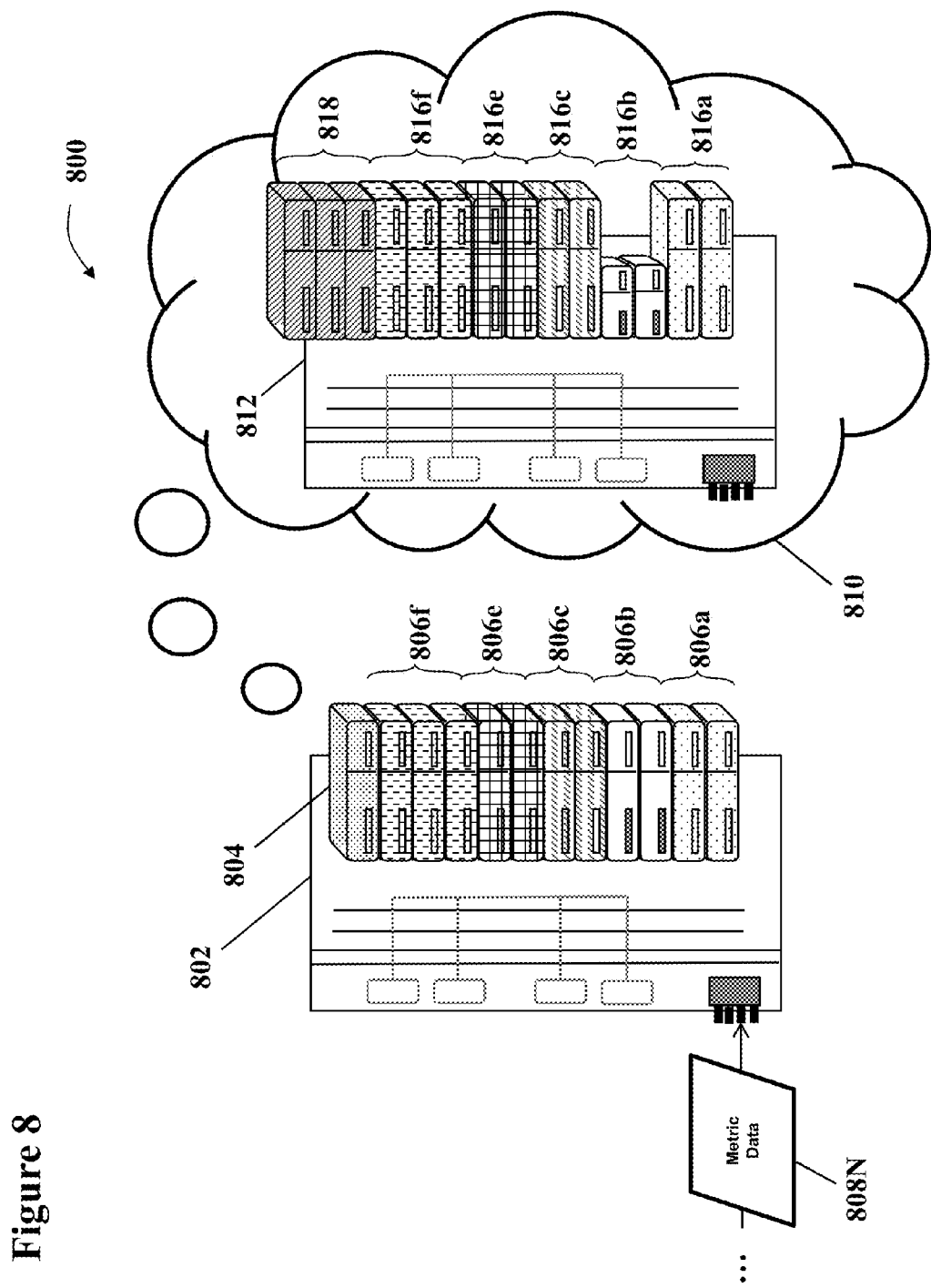
FIG. 8 shows a simulation of a recovery event performed at a backup site according to an embodiment of the invention.

Turning now to FIG. 8, a simulation 800 of a recovery event according to an embodiment of the invention is shown. As shown, simulation 800 is performed on a backup site 802, although it should be recognized that simulation 800 can also be performed on primary site 180 (FIG. 1) or a tertiary site. As illustrated, backup site 802 includes a set of applications 806a-f. In addition, backup site 802 includes a simulation hypervisor 804, which performs a recovery simulation 810. Recovery simulation 810 is performed by combining metric data 808N with the production data (e.g., FIG. 7) from applications 806a-f on backup site 802. To this extent, recovery simulation 810 can generate a backup site representation 812 of the combination of metric data 808N and production data. As shown, backup site representation 812 includes application representations 816a-f corresponding to the applications 806a-f in backup site 802. Note that application representation 816b has a diminished representation. This diminished representation represents an application 806a-f on backup site 802 that has been designated as being a lower priority application. This lower priority application has been assumed in backup site representation 812 as being in a dormant state during a recovery event. In addition, recovery representation 812 includes a backup representation 818 corresponding to the metric data 808N. Note that this backup representation 818 is illustrated as having been added to the applications 806a-f being executed in recovery representation.

Figure 9:
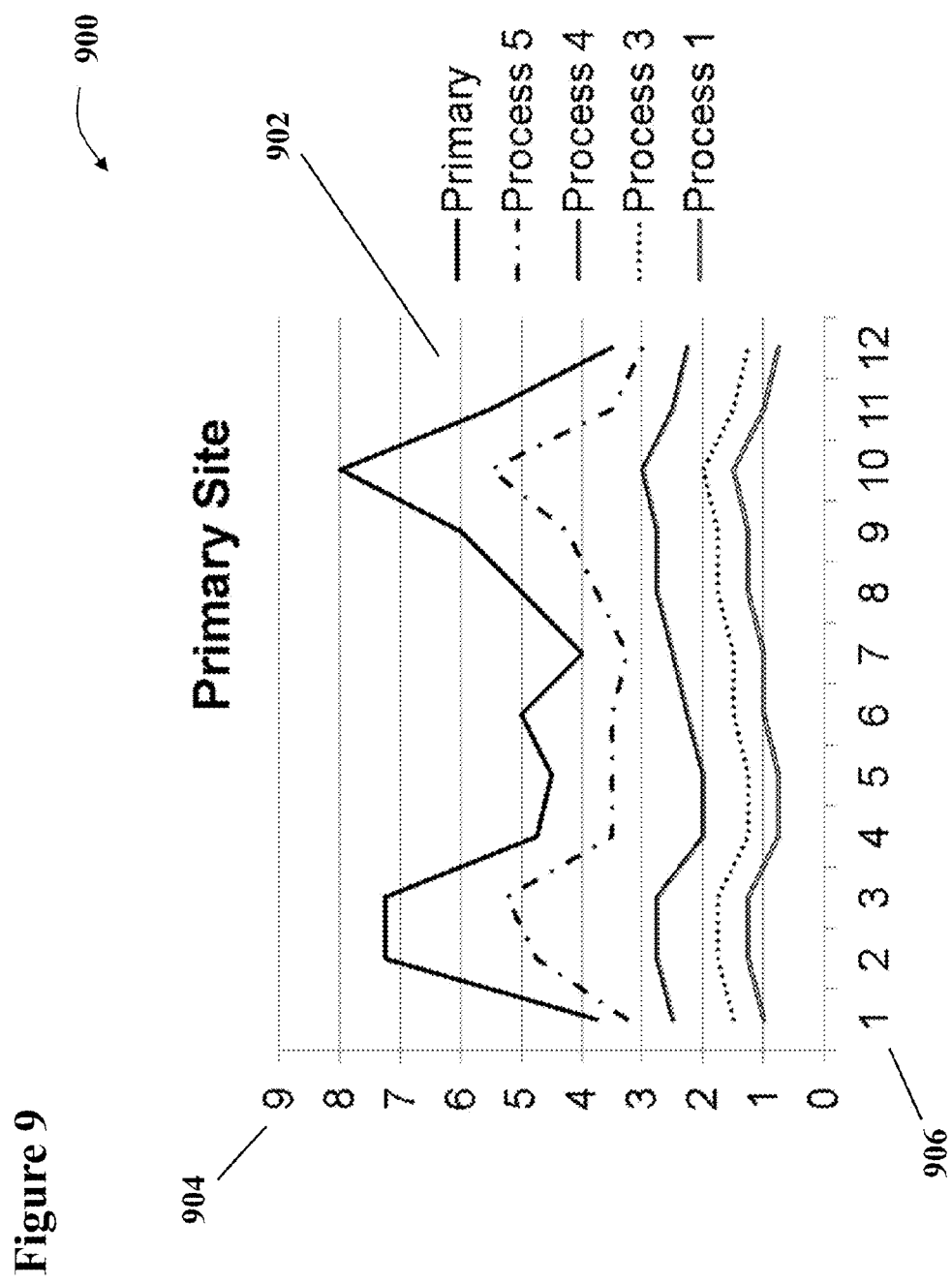
FIG. 9 shows an example graph representation of a simulation of a recovery event according to an embodiment of the invention.

Turning now to FIG. 9, an example graph representation 900 of a simulation of a recovery event according to an embodiment of the invention is shown. As illustrated graph representation 900 includes a number of aggregating plot lines 902. Similar to plot line 602 in graph representation 600 (FIG. 6) and plot lines 702 in graph representation 700 (FIG. 7), plot lines 902 indicate an amount of resource use 904 over a time period 906. Each plot line 902 represents a process in aggregation with the plot lines 902 beneath it. These plot lines 902 include those of process 1, process 3, process 4, and process 5 from backup site 802 (FIG. 8). Note that plot lines 902 are not influenced by process 2 due to the fact that process 2 has been assumed as being in a dormant state for purposes of the simulation. Also included in plot lines 902 is a primary plot line corresponding to plot line 602 (FIG. 6) from metric data 420A-N received from primary site 402 (FIG. 4), which has been aggregated with the production data corresponding to the backup site 802 (FIG. 8). For purposes of illustration only, the aggregation of plot lines 904 in graph representation 900 represents an amount of resources on the backup site 802 (FIG. 8) that would be used if the current production environment had to be transformed to a disaster recovery environment.

Returning again to FIG. 1, disaster planning module 148, as executed by computer system 102, performs a disaster planning based on the simulation performed by recovery simulation module 146. This disaster planning can use the simulation to determine whether the backup site 202 (FIG. 2) has sufficient resources to handle a disaster recovery event. Further, this disaster planning can determine whether excess resources can be utilized on a particular backup site 202 (FIG. 2) for disaster recovery from an additional primary site 402 (FIG. 4). In addition, these results can be combined with results from simulations performed on other backup sites 802 (FIG. 2), such as by aggregating the results at a central location. This combination can be used to perform capacity planning for the "production workload" network and "components in scope" in part or whole could be used to fail-over an entire data center or whatever portion thereof that is deemed to be critical. Further, in the case that the simulation is performed on the backup site 802 (FIG. 8) using data from both the primary site 402 (FIG. 4) and the backup site 802 (FIG. 8) in real time, the results can take into account both the hardware of the backup site 802 (FIG. 8), itself, the exact hypervisor used to perform the recovery event on the backup site 802 (FIG. 8) and the applications that would need to be included in a disaster recovery. In addition, the fact that the simulation is run in the background using metric data 808 (FIG. 8) minimizes the impact that the simulation would have on the normal production environment of the backup site 802 (FIG. 8).

One solution for disaster recovery (described in commonly owned U.S. patent application Ser. No. 12/955,483, and incorporated herein) uses virtualized capacity for DR. In this solution, a live site that is deemed to have sufficient available capacity and criticality of workload is selected as a DR site. In case of a DR event non-critical workload on the DR site can be crushed to make additional head-room for the production workload from the failed site.

Figure 10:
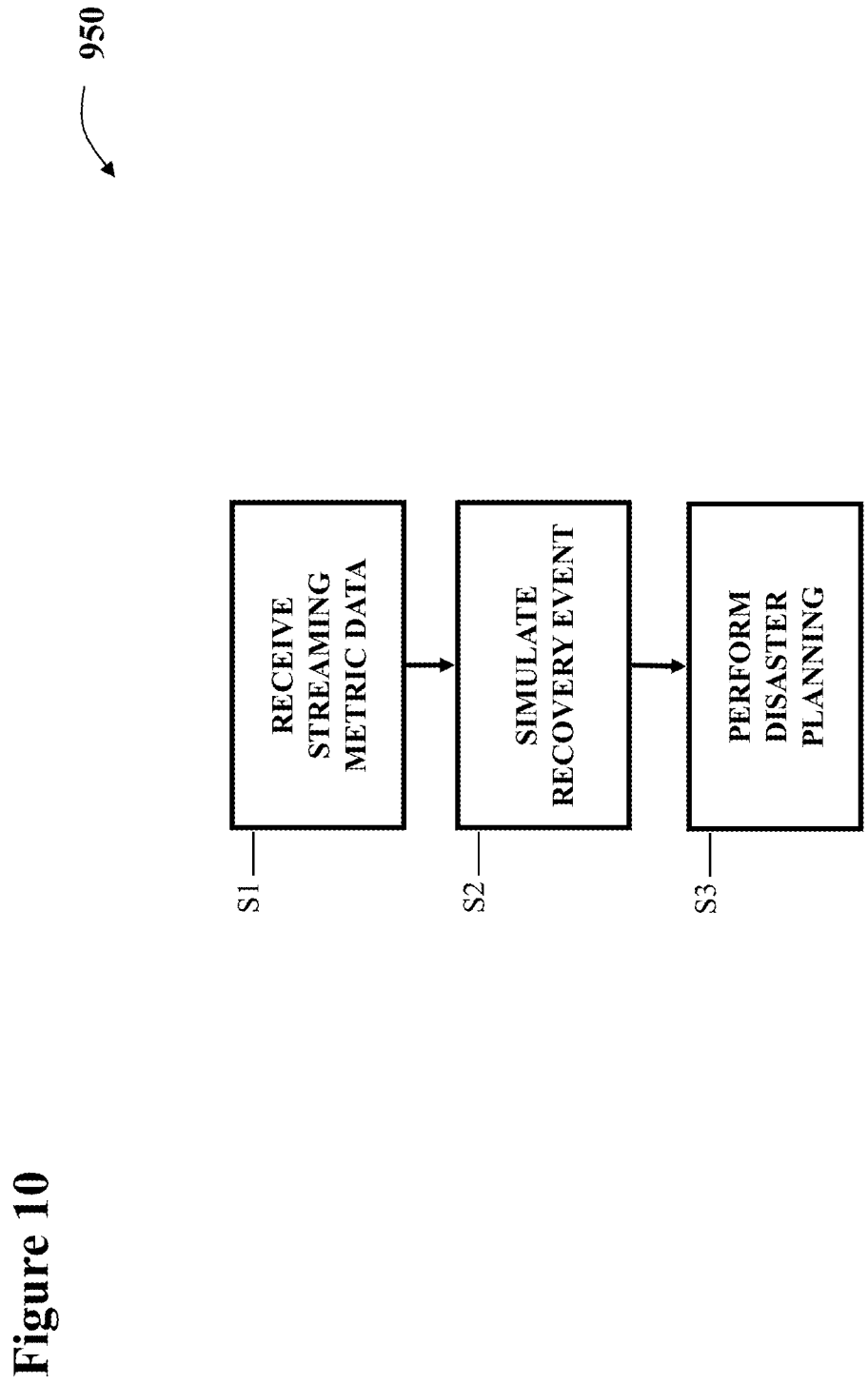
FIG. 10 shows an example flow diagram according to an embodiment of the invention.

Turning now to FIG. 10, an example flow diagram 950 according to embodiments of the invention is shown. Referring to FIG. 10 in conjunction with FIG. 1, as illustrated, in S1, metric receiving module 144, as executed by computer system 102, receives, at a simulation hypervisor 142, streaming metric data 152 from a primary site 402 (FIG. 4). The simulation hypervisor 142 can be installed on a hardware component 214 (FIG. 2) that has been specifically configured to execute the simulation hypervisor 142 on a primary site 180, on the backup site 170 and/or on a tertiary site separate from the primary site 180 and the backup site 170. This streaming metric data 152 represents the current production workload of the primary site 402 (FIG. 4). This streaming metric data 152 can be received from hypervisor module 182 on primary site 180. In S2, recovery simulation module 146, as executed by computer system 102, simulates a recovery event. This recovery event can be simulated by combining the metric data 152 with production data (application 174) of the backup site 170. This simulation can be performed in real time in the background of the backup site 170. In S3, disaster planning module 148, as executed by computer system 102, performs a disaster planning based on the simulating. This disaster planning could include determining that a particular backup site 170 has sufficient resources, does not have sufficient resources, or has extra resources in case of a disaster recovery event. Based on this determination, resources could be added and/or backup data could be reallocated to or away from the backup site. Further, capacity planning could also be performed.

While shown and described herein as a method and system for determining disaster capacity, it is understood that aspects of the invention further provide various alternative embodiments. For example, in one embodiment, the invention provides a computer program fixed in at least one computer-readable medium, which when executed, enables a computer system to determine disaster capacity. To this extent, the computer-readable medium includes program code, such as disaster capacity planning program 140 (FIG. 1), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as disaster capacity planning program 140 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for determining disaster capacity. In this case, a computer system, such as computer system 102 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

In another embodiment, the invention provides a method that performs the process of the invention on a subscription, advertising, and/or fee basis. That is, a service provider, such as a Solution Integrator, could offer to provide disaster capacity determining. In this case, the service provider can create, maintain, and support, etc., a computer infrastructure, such as computer infrastructure 102 (FIG. 1) that performs the process of the invention for one or more customers. In return, the service provider can receive payment from the customer(s) under a subscription and/or fee agreement and/or the service provider can receive payment from the sale of advertising content to one or more third parties.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "approximately" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to approximately 25 wt %, or, more specifically, approximately 5 wt % to approximately 20 wt %", is inclusive of the endpoints and all intermediate values of the ranges of "approximately 5 wt % to approximately 25 wt %," etc).

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method for determining disaster recovery capacity, comprising:
   receiving, by a simulation hypervisor, streaming metric data from a primary site, the streaming metric data representing a current production workload of the primary site;
   simulating, by the simulation hypervisor, a recovery event on a backup site by combining the metric data with production data of the backup site,
      wherein the simulating includes designating an application on the primary site as being a lower priority application and assuming a dormant state for the lower priority application; and
   performing disaster planning based on the simulating.

2. The method of claim 1, wherein the receiving and the simulating are performed in real time.

3. The method of claim 1, wherein the streaming metric data is received from a hypervisor module on the primary site.

4. The method of claim 1, wherein the primary site and the backup site are geographically distant.

5. The method of claim 1, further comprising performing capacity planning based on the simulating.

6. The method of claim 1, further comprising:
   configuring a hardware component to execute the simulation hypervisor; and
   installing the hardware component on a site.

7. The method of claim 1, further comprising:
   installing a simulation hypervisor on a backup site,
   wherein the simulating is run in a background of the backup site.

8. A system for determining disaster recovery capacity, comprising:
   a computer device including a processor having a simulation hypervisor installed thereon, the simulation hypervisor performing a method, comprising:
   receiving, by the simulation hypervisor, streaming metric data from a primary site, the streaming metric data representing a current production workload of the primary site;
   simulating, by the simulation hypervisor, a recovery event on a backup site by combining the metric data with production data of the backup site,
      wherein the simulating includes designating an application on the primary site as being a lower priority application and assuming a dormant state for the lower priority application; and
   performing disaster planning based on the simulating.

9. The system of claim 8, wherein the receiving and the simulating are performed in real time.

10. The system of claim 8, wherein the streaming metric data is received from a hypervisor module on the primary site.

11. The system of claim 8, wherein the primary site and the backup site are geographically distant.

12. The system of claim 8, wherein the method further comprises performing capacity planning based on the simulating.

13. The system of claim 8, further comprising:
   configuring a hardware component to execute the simulation hypervisor; and
   installing the hardware component on a site.

14. The system of claim 8,
   wherein the computer device is the backup site, and
   wherein the simulating is run in a background of the backup site.

15. A computer program product embodied in a non-transitory computer readable storage medium that implements a method for determining disaster recovery capacity, the method comprising:
   receiving, by a simulation hypervisor, streaming metric data from a primary site, the streaming metric data representing a current production workload of the primary site;
   simulating, by the simulation hypervisor, a recovery event on a backup site by combining the metric data with production data of the backup site,
      wherein the simulating includes designating an application on the primary site as being a lower priority application and assuming a dormant state for the lower priority application; and
   performing disaster planning based on the simulating.

16. The computer program product of claim 15, wherein the receiving and the simulating are performed in real time.

17. The computer program product of claim 15, wherein the streaming metric data is received from a hypervisor module on the primary site.

18. The computer program product of claim 15, wherein the primary site and the backup site are geographically distant.

19. The computer program product of claim 15, the method further comprising performing capacity planning based on the simulating.

20. The computer program product of claim 15, further comprising:
   configuring a hardware component to execute the simulation hypervisor; and
   installing the hardware component on a site.

21. The computer program product of claim 15, the method further comprising:
   installing a simulation hypervisor on a backup site,
   wherein the simulating is run in a background of the backup site.

22. A method for deploying a system for determining disaster recovery capacity, comprising, providing a computer system operable to:

receive, by a simulation hypervisor, streaming metric data from a primary site, the streaming metric data representing a current production workload of the primary site;

simulate, by the simulation hypervisor running, a recovery event on a backup site by combining the metric data with production data of the backup site, wherein the simulation includes designating an application on the primary site as being a lower priority application and assuming a dormant state for the lower priority application; and perform disaster planning based on the simulating.

* * * * *